UNITED STATES PATENT OFFICE.

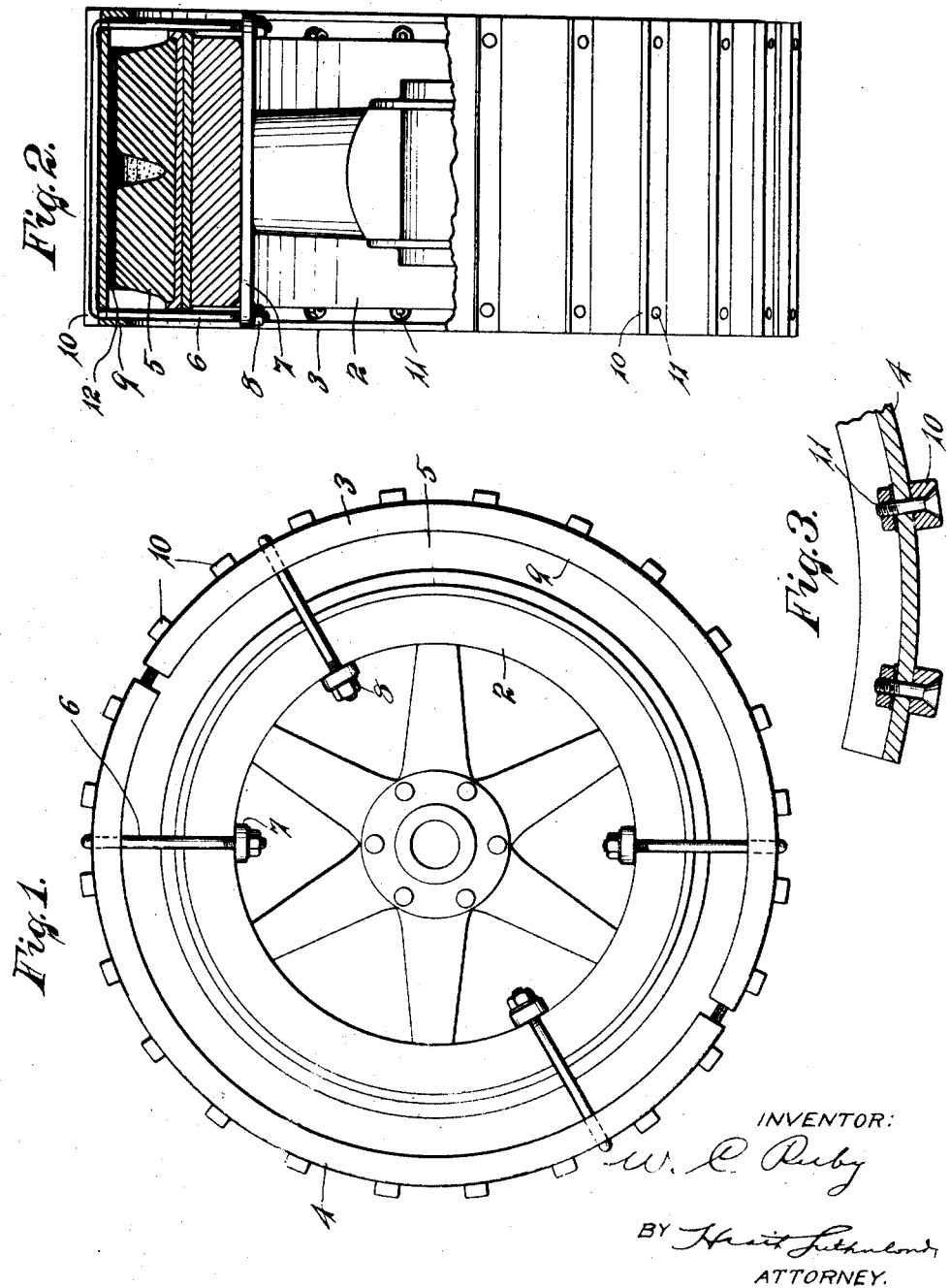

WILBERT C. RUBY, OF WEST WILLINGTON, CONNECTICUT.

NON-SKID DEVICE.

1,365,728.     Specification of Letters Patent.     Patented Jan. 18, 1921.

Application filed March 27, 1920. Serial No. 369,250.

*To all whom it may concern:*

Be it known that I, WILBERT C. RUBY, a citizen of the United States, residing at West Willington, in the county of Tolland and State of Connecticut, have invented certain new and useful Improvements in Non-Skid Devices, of which the following is a specification.

This invention relates to a non-skid device for automobile tires especially such as those used on trucks, tractors and similar vehicles. The article may be used on wheels other than those equipped with rubber or like tires. I have several motives in view among them being the provision of means which is capable of inexpensive construction and which can be readily applied to a wheel to prevent the same sinking in muddy heavy soil. The article comprises other features of novelty and advantage which with the foregoing will be set forth at length in the following description wherein I will outline in detail that form of embodiment of the invention which I have selected for illustration in the drawings accompanying and forming part of the present case. Clearly I am not restricted to this disclosure. I may depart therefrom in a number of respects within the scope of the invention defined by the claim following said description.

Referring to said drawings:

Figure 1 is a side elevation of a wheel involving the invention.

Fig. 2 is a top plan view with a portion broken out and in section.

Fig. 3 is a sectional detail.

Like characters refer to like parts throughout the several views.

In the drawings I have shown a wheel 2 which forms part of the tractive equipment of various vehicles such as automobile trucks and tractors. Associated with this wheel are several segments. There may be any suitable number of these segments although two answer my requirements. Those shown are denoted by 3 and 4 respectively and practically consist of semi-circular plates which are adapted to fit against, although not always directly against, the tire 5 of the wheel 2, this tire as will be understood being of the kind familiar in the wheels of trucks.

The two semi-circular segments or plates 3 are held rigidly yet removably to the tread portion of the wheel in some suitable manner, a way of doing which will now be set forth. When the two segments or plates are in operative position as shown for instance in Fig. 1 their ends are slightly separated although this is not a matter of vital importance. The plates may be held to the wheel in various manners, the U-bolts 6 answering my requirements in this connection, the brackets or arms of the bolts extending through perforations or holes near the lateral of side portions of the segments and the cross bars thereof bearing against the outer faces of the segments. As shown there are two U-bolts in connection with each segment although this number may be varied. The arms or sides of the U-bolts 6 practically fit against the side faces of the rim portion of the wheel and their inner ends extend through holes or perforations in the ties or cross pieces 7, said sides being threaded to receive nuts 8 to hold the U-bolts firmly and substantially in position and at the same time to press the ties or cross pieces 7 firmly against the inner side of the rim portion of the wheel, the several bolts being assumed to be set in Fig. 1 and also in Fig. 2 for that matter.

The width of the segments 3 and 4 is greater than that of the wheel 2 so as to provide an ample surface for the wheel when the segments are applied thereto. This will effectually prevent the wheel sinking into soft or muddy ground which is a feature of importance. The segments 3 and 4 are provided throughout their extent with the side flanges or lips 9 and the branches or sides of the U or clip-bolts 6 are between the side flanges of the respective segments. As a matter of fact for further security the sides of these U or clip-bolts 6 engage the inner surfaces of the respective lateral flanges or lips 9.

The segments are provided on their outer sides with transverse strips 10 practically rectangular in cross section and held in position to the respective segments by bolts 11 the heads of the bolts as shown being countersunk in the respective strips and the nuts of the bolts being fitted against the inner surfaces of the respective segments as best shown in Fig. 3.

To compensate for wear, I may interpose between the segments 3 and 4 and the tread portion of the normal tire part of the wheel, strips as 12 of some textile material, the strips of which there may be one or several in superimposed order, fitting the space between the inner surfaces of the segments and the tread portion of the tire of the wheel. In some cases it may not be necessary to insert such a strip. In other cases one may answer, while again several may be required.

What I claim is:

A device to be applied to the tire of a wheel, comprising a plurality of semi-circular plates the ends of which are respectively in adjacence to each other, the width of the plates being greater than the width of the tire of the wheel to which the plates are to be applied, the plates having side flanges, U-bolts the side branches of which extend through perforations in the plates, between the side flanges thereof, the transverse portions of the U-bolts fitting against the outer surfaces of the respective segments, cross pieces connecting the side branches of the bolts at their inner ends, parallel strips extending straight across the outer surfaces of the segments, and fastening bolts extending through the parallel segments and the first mentioned segments, one portion of each fastening bolt being fitted against the inner surface of a segment and another portion thereof being countersunk in a cross bar.

In testimony whereof I affix my signature in the presence of two witnesses.

WILBERT C. RUBY.

Witnesses:
 CLARENCE ELDREDGE,
 GEORGE B. ROBBINS.